(12) United States Patent
Ohtake et al.

(10) Patent No.: US 12,119,742 B2
(45) Date of Patent: Oct. 15, 2024

(54) INTEGRATED CIRCUIT AND METHOD OF DIGITALLY CONTROLING CRITICAL MODE POWER FACTOR CORRECTION CIRCUIT

(71) Applicant: SANKEN ELECTRIC CO., LTD., Niiza (JP)

(72) Inventors: Osamu Ohtake, Niiza (JP); Ryuichi Furukoshi, Niiza (JP)

(73) Assignee: SANKEN ELECTRIC CO., LTD., Niiza (JP)

( * ) Notice: Subject to any disclaimer, the term of this patent is extended or adjusted under 35 U.S.C. 154(b) by 129 days.

(21) Appl. No.: 17/690,034

(22) Filed: Mar. 9, 2022

(65) Prior Publication Data

US 2022/0294337 A1 Sep. 15, 2022

(30) Foreign Application Priority Data

Mar. 12, 2021 (JP) ................................. 2021-039776

(51) Int. Cl.
*H02M 1/42* (2007.01)
*H02M 3/335* (2006.01)

(52) U.S. Cl.
CPC ......... *H02M 1/4208* (2013.01); *H02M 3/335* (2013.01)

(58) Field of Classification Search
CPC ...... H02M 1/4208; H02M 3/335; H02M 7/12; H02M 1/42
See application file for complete search history.

(56) References Cited

U.S. PATENT DOCUMENTS 8,564,992 B2 * 10/2013 Takahashi ........... H02M 1/4225
323/222
9,935,645 B1 4/2018 Tangudu et al.
(Continued)

FOREIGN PATENT DOCUMENTS

CN 101888172 A * 11/2010
CN 110690815 A * 1/2020 .......... H02M 1/4225
(Continued)

OTHER PUBLICATIONS

Office Action mailed on Mar. 19, 2024 in a counterpart Japanese patent application.
(Continued)

*Primary Examiner* — Thienvu V Tran
*Assistant Examiner* — Yahveh Comas Torres
(74) *Attorney, Agent, or Firm* — METROLEX IP LAW GROUP, PLLC; Robert L. Scott, Esq.

(57) ABSTRACT

An integrated circuit for digitally controlling a critical mode power factor correction (PFC) circuit according to one or more embodiments may include: an output voltage detector and a switching current detector; an A/D converter and a sample and hold circuit that perform analog-to-digital conversion of an output signal of the output voltage detector and the switching current detector; an arithmetic unit that performs calculation based on the output signal of the A/D converter and generates a pulse signal to turn on/off a switching device of the PFC circuit; a correction value calculator that calculates, based on a switching frequency of the PFC circuit, a correction value for linearly correcting the output signal of the A/D converter; and an adder that adds the correction value to the output signal of the A/D converter to correct the output signal of the A/D converter and inputs the corrected output signal to the arithmetic unit.

3 Claims, 7 Drawing Sheets

(56) References Cited

U.S. PATENT DOCUMENTS

| | | | |
|---|---|---|---|
| 2011/0037628 A1 | 2/2011 | Petrovic | |
| 2015/0062985 A1* | 3/2015 | Colbeck | H02M 1/4225 363/89 |
| 2015/0070953 A1* | 3/2015 | Colbeck | H02M 7/217 363/84 |
| 2016/0190912 A1* | 6/2016 | Lim | H02M 1/4225 363/84 |
| 2021/0391781 A1* | 12/2021 | Endo | H02M 1/0012 |

FOREIGN PATENT DOCUMENTS

| | | | |
|---|---|---|---|
| JP | 2008-182508 A | | 8/2008 |
| JP | 2011-091981 A | | 5/2011 |
| TW | 201203820 A | * | 1/2012 |

OTHER PUBLICATIONS

Office Action (Decision to Grant a Patent) issued on Jun. 18, 2024 in a counterpart Japanese patent application No. 2021-039776.

* cited by examiner

EQUIVALENT CIRCUIT

DETECTION CIRCUIT

COMPARATIVE EXAMPLE

FIG. 9   COMPARATIVE EXAMPLE
UNDER HIGH LOAD
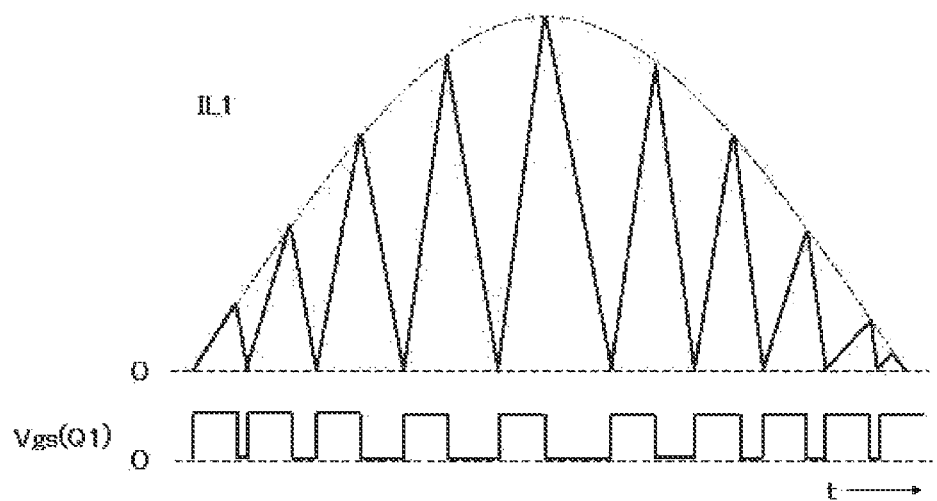
UNDER LOW LOAD
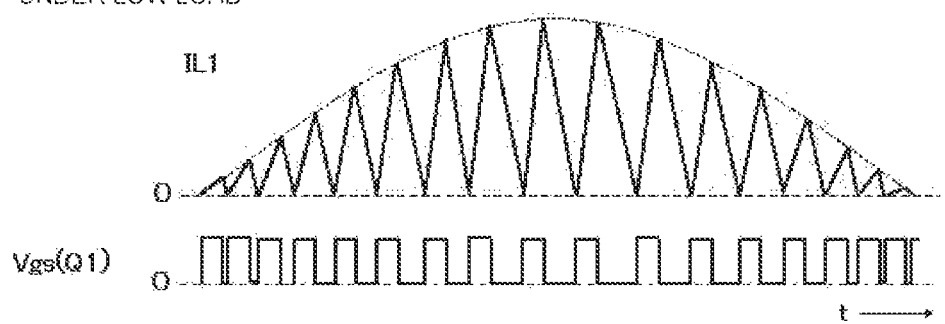

FIG. 10 COMPARATIVE EXAMPLE
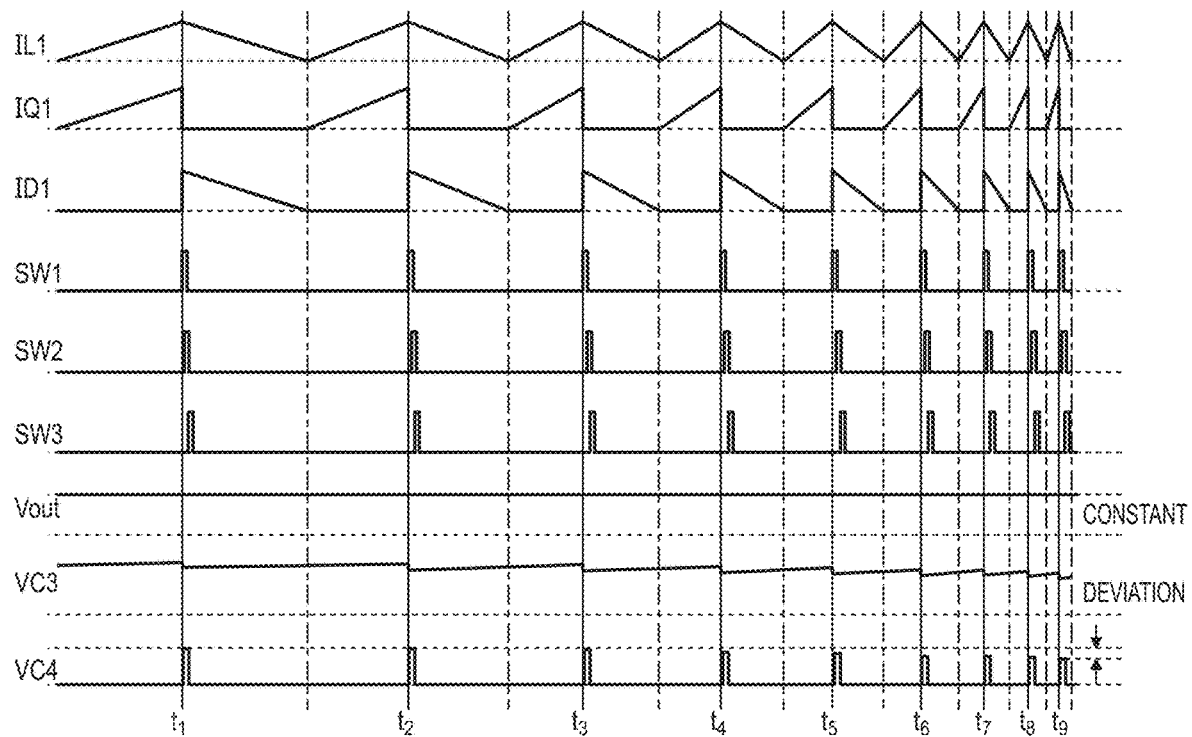

FIG. 11  COMPARATIVE EXAMPLE
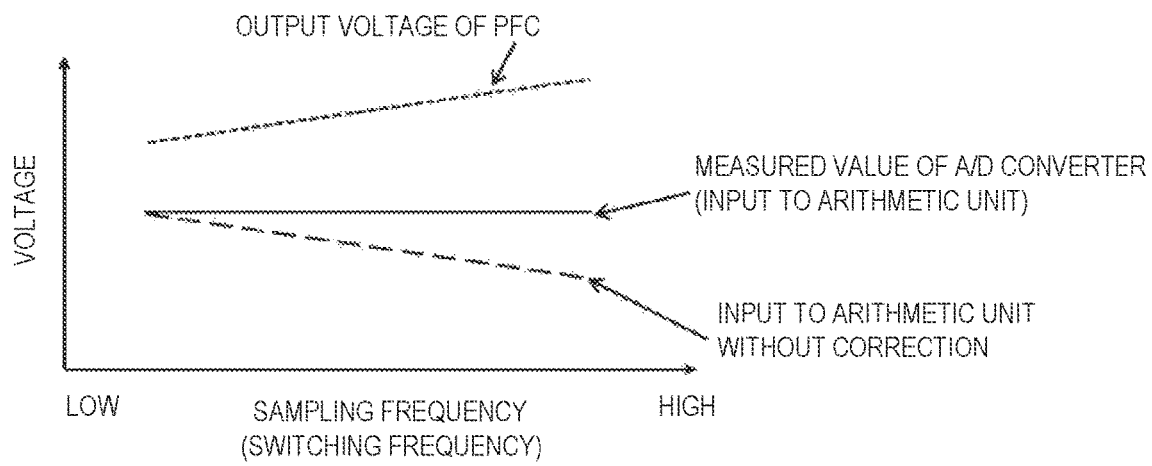
FIG. 12  PRIOR ART
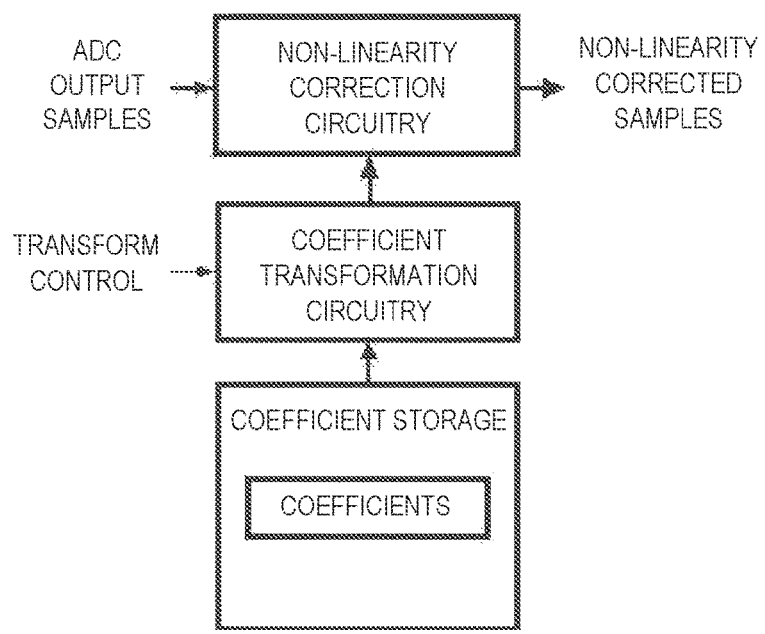

INTEGRATED CIRCUIT AND METHOD OF DIGITALLY CONTROLING CRITICAL MODE POWER FACTOR CORRECTION CIRCUIT

CROSS REFERENCE TO RELATED APPLICATIONS

This application claims priority based on 35 USC 119 from prior Japanese Patent Application No. 2021-039776 filed on Mar. 12, 2021, entitled "INTEGRATED CIRCUIT AND METHOD FOR DIGITALLY CONTROLLING CRITICAL MODE POWER FACTOR CORRECTION CIRCUIT", the entire contents of which are incorporated herein by reference.

BACKGROUND

The disclosure may relate to an integrated circuit digitally controlling a critical mode power factor correction circuit that converts an AC input voltage into a DC output voltage and including an analog-to-digital (A/D) converter that performs analog-to-digital conversion of detection signals.

A home appliance such as an LCD TV and an OLED TV uses a power factor correction (PFC) circuit and a DC/DC converter to generate a stable output voltage from an AC power supply. In particular, the power factor correction circuit performs digital control for the purpose of stabilizing quality, lowering cost, and reducing size. For this reason, an analog-to-digital converter (hereinafter may be referred to as an A/D converter) is employed to convert analog signals, such as an output voltage and a switching current of the power factor correction circuit, into digital signals. A sampling frequency of the A/D converter is generally fixed. To the contrary, in a power factor correction circuit of a critical mode method such as being illustrated in FIG. 8, an oscillation frequency varies according to an input voltage, like the reactor current IL1 illustrated in FIG. 9, and also varies depending on a magnitude of a load power. Therefore, for digital control of the critical mode power factor correction circuit, at least an A/D converter that converts the analog signals including the reactor current signal and the output voltage signal into digital signals may be needed, while the sampling may have to be done in synchronization with the switching frequency. In addition, the output voltage of the power factor correction circuit is high voltage such as about 400V or the like, and due to energy conservation regulations, the loss in a detection circuit that detects analog signals may have to be suppressed. As a result, the detection circuit has high-impedance, and thus the detection accuracy may be deteriorated when the sampling frequency is high. Namely, the detection circuit in the front stage of a sample and hold circuit (hereinafter may be referred to as a S&H circuit) of the critical mode power factor correction circuit includes resistors R1 and R2 as illustrated in FIG. 8 and thus has a high resistance value. As illustrated in FIG. 10, when the sampling frequency increases, the voltage values that are not sufficiently charged in the capacitors C3 and C4 due to the relationship of time constants with the S/H circuit in the subsequent stage are analog/digital converted, and thus the detection value VC4 becomes lower than when the sampling frequency is low. This may result in a problem that the output voltage of the power factor correction circuit increases above a set voltage as the sampling frequency increases, as illustrated in FIG. 11. Here, U.S. Pat. No. 9,935,645 (Patent Document 1) discloses an A/D converter that changes a sampling rate, although the A/D converter is not limited to a power factor correction circuit.

FIG. 12 illustrates a nonlinear correction system for the A/D converter disclosed in U.S. Pat. No. 9,935,645 (Patent Document 1), which includes a coefficient storage, a coefficient transformation circuitry, and a correction circuitry. The coefficient storage is encoded with a first set of coefficients for correcting nonlinearity of the A/D converter at a first sampling rate. The coefficient transformation circuitry is coupled to the coefficient storage. The coefficient transformation circuitry is configured to generate a second set of coefficients for correcting nonlinearity of the A/D converter at a different sampling rate. The correction circuitry is configured to apply the second set of coefficients to correct nonlinearity in output of the A/D converter while the A/D converter is operating at the different sampling rate.

Patent Document 1: U.S. Pat. No. 9,935,645

SUMMARY

According to the system disclosed in U.S. Pat. No. 9,935,645, nonlinearity in the output of the A/D converter is corrected at the two different sampling rates. However, this requires a control circuit that is configured to calculate at the two sampling rates per one switching, for example, a CPU having high processing performance and high processing speed, which is expensive. Especially, in a case where the A/D converter and the control circuit described above become expensive when being employed in a power factor correction circuit in a large TV such an LCD TV, an OLED, and the like. An object of one or more embodiments of the disclosure may be to provide digital control of a critical mode power factor correction circuit capable of calculating a correction value to perform simple linear correction of an output of an analog-to-digital converter.

An aspect of one or more embodiments of the disclosure may be an integrated circuit for digitally controlling a critical mode power factor correction circuit. The integrated circuit may include: an output voltage detector and a switching current detector of the critical mode power factor correction circuit; an A/D converter and a sample and hold circuit that perform analog-to-digital conversion of an output signal of the output voltage detector and the switching current detector, wherein a sampling frequency of the A/D converter and the sample and hold circuit is synchronized with a variable switching frequency of the critical mode power factor correction circuit; an arithmetic unit that performs calculation based on the output signal of the A/D converter and generates pulse signal to turn on and off a switching device of the critical mode power factor correction circuit; a correction value calculator that calculates, based on the sampling frequency, a correction value for linearly correcting the output signal of the A/D converter; and an adder that adds the correction value calculated by the correction value calculator to the output signal of the A/D converter to correct the output signal of the A/D converter and inputs the corrected output signal to the arithmetic unit.

According to the aspect, a size of a circuit around the A/D converter in the integrated circuit that performs digital control of the critical mode power factor correction circuit can be reduced. Furthermore, by calculating the correction value using the linear correction formula, a general-purpose arithmetic unit (CPU) can be used instead of a high-speed and expensive arithmetic unit (CPU).

BRIEF DESCRIPTION OF DRAWINGS

FIG. 9 is a diagram illustrating an operational principle in control of the comparative example illustrated in FIG. 8;

FIG. 10 is a diagram illustrating operating waveforms of a typical A/D converter of the comparative example illustrated in FIG. 8;

FIG. 11 is a diagram for explaining an issue in control using the A/D converter of the comparative example illustrated in FIG. 8; and FIG. 12 is a block diagram illustrating an A/D converter disclosed in Patent Document 1 (U.S. Pat. No. 9,935,645).

DETAILED DESCRIPTION

Figure 1:
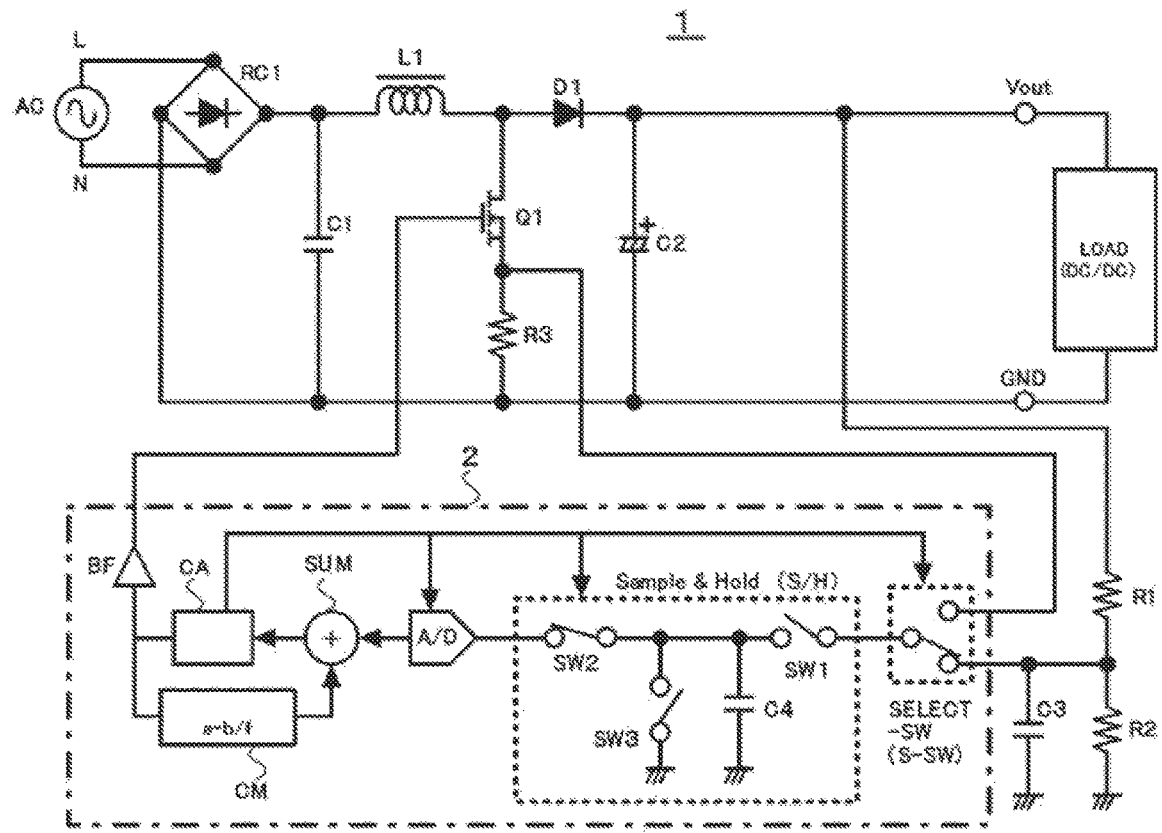
FIG. 1 is a diagram illustrating a configuration of a critical mode power factor correction circuit that performs digital control according to an embodiment or embodiments.

Descriptions are provided hereinbelow for one or more embodiments based on the drawings. In the respective drawings referenced herein, the same constituents are designated by the same reference numerals and duplicate explanation concerning the same constituents is omitted. All of the drawings are provided to illustrate the respective examples only.

Embodiments

FIG. 1 illustrates a power factor correction circuit (PFC) 1 of a critical mode method according to an embodiment or embodiments. The critical mode power factor correction circuit 1 full-wave rectifies an AC power supply, switches the rectified AC voltage by a series connection circuit of a reactor L1 and a switching device Q1 (or a switching element), superimposes a stored energy of the reactor L1 on the full-wave rectified voltage, and supplies it to the output smoothing capacitor C2 through the diode D1, to thereby generate a predetermined output voltage (approximately 400V) and supply the output voltage to a load. The switching device Q1 is switched with the ON time of the switching device Q1 being almost fixed to a period of a half or more of a cycle of the commercial frequency. The switching device Q1 is turned on at the point where a reactor current flowing in the reactor L1 when the switching device Q1 is off becomes zero (the critical point). As a result, the current flowing in the AC power supply has a waveform similar to that of the AC voltage, as illustrated in FIG. 9, and power factor improvement can be achieved. Here, signals used for on/off control of the switching device Q1 are a signal of the output voltage Vout and a signal of the drain current of the switching device Q1. The signal of the output voltage Vout is used to calculate the ON time for feedback control of the output voltage Vout, and the signal of the switching device Q1 is used to limit excessive current flow to the switching device Q1. A control circuit 2 performs the on/off control of the switching device Q1. The control circuit 2 includes a gate driver BF for the switching device Q1, an arithmetic unit CA, a correction value calculator CM, an adder SUM, an analog-to-digital converter A/D (hereinafter may be referred to as an A/D converter ND), a sample and hold circuit S/H, and a selection switch S-SW. The control circuit 2 is configured as an integrated circuit. Referring to FIG. 1, in the control circuit 2, a signal (a voltage divider signal) of the output voltage Vout obtained by dividing the output voltage Vout by resistors R1 and R2 and a capacitor C3 and a signal of the drain current of the switching device Q1 which is a voltage drop signal of a resistor R3 are connected and input to the sample and hold circuit S/H via the selection switch S-SW configured to switch between the signal of the output voltage Vout and the signal of the drain current of the switching device Q1. An output of the sample and hold circuit S/H is connected to the A/D converter ND, and an output of the A/D converter ND is connected to the arithmetic unit CA via the adder SUM. The arithmetic unit CA calculates an output signal of the adder SUM by comparing the output signal of the adder SUM with a reference voltage (not illustrated) and outputs a pulse signal to the gate driver BF to drive the switching device Q1 and to the correction value calculator CM. An output of the correction value calculator CM is connected to the adder SUM. In other words, the adder SUM adds the signal output from the A/D converter A/D and the correction signal output from the correction value calculator CM, and inputs the addition result to the arithmetic unit CA. At this time, the correction value calculator CM calculates the correction value which is linearly corrected based on the frequency of the pulse signal output from the arithmetic unit CA.

Figure 2:
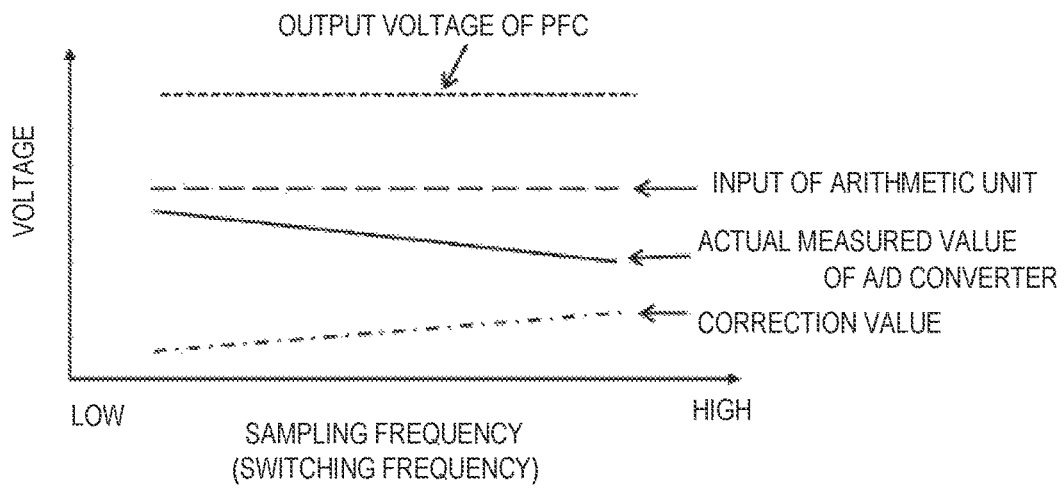
FIG. 2 is a conceptual diagram illustrating an operating frequency and operating voltage waveforms of parts in a power factor correction circuit, such as is illustrated in FIG. 1.
Figure 8:
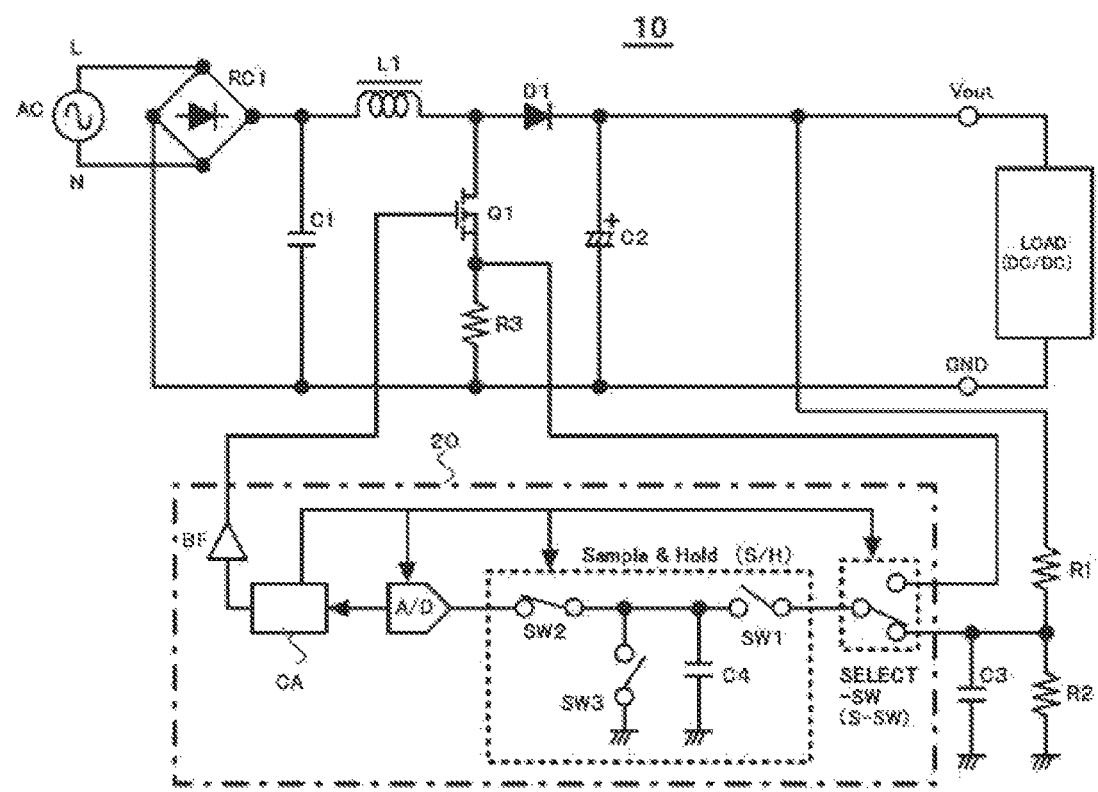
FIG. 8 is a circuit diagram illustrating a comparative example.

What is different from a power factor correction circuit 10 of a comparative example illustrated in FIG. 8 is that the control circuit 2 of the power factor correction circuit 1 according to an embodiment or embodiments includes the correction value calculator CM that calculates the correction value (a-b/f) and the adder SUM that adds the correction value (a-b/f) calculated by the correction value calculator CM to the output signal of the A/D converter A/D. FIG. 2 is a schematic diagram illustrating a relationship between a switching frequency and operating voltage waveforms of parts in the power factor correction circuit 1 illustrated in FIG. 1. As illustrated in FIG. 2, as a load power of the critical mode power factor correction circuit 1 changes from heavy load to low load and thus the switching frequency changes from low frequency to high frequency, the actual measured value of the output of the A/D converter ND decreases. Here, by adding the correction value calculated by the correction value calculator CM, which is illustrated by the single-dotted chain line in FIG. 2, to the output of the A/D converter A/D, the input voltage to the arithmetic unit CA is kept constant and therefore the output voltage Vout of the critical mode power factor correction circuit 1 becomes constant.

Figure 3:
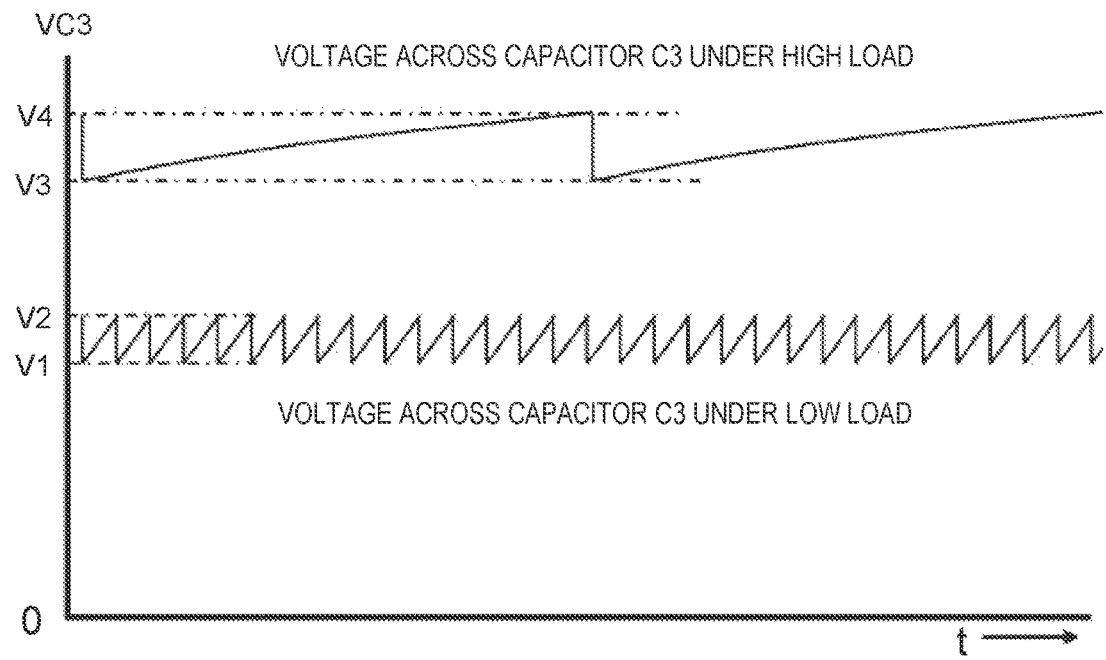
FIG. 3 is a diagram illustrating a voltage VC3 of a capacitor C3, which is a voltage divider signal of an output voltage Vout of a power factor correction circuit, such as is illustrated in FIG. 1.

Note that FIG. 2 is a conceptual diagram illustrating the correction of the output of the A/D converter A/D. The method of calculating the correction value is explained in detail below. FIG. 3 is a diagram illustrating a voltage divider signal of the output voltage Vout of the power factor correction circuit 1 illustrated in FIG. 1, which is the voltage VC3 of the capacitor C3. As illustrated in FIG. 3, the voltage divider signal of the output voltage Vout (i.e., the voltage VC3 of the capacitor C3) varies according to the sampling frequency of the A/D converter, that is, according to a switching frequency. When the critical mode power factor correction circuit 1 is under high load, the sampling frequency is low, the value of the voltage VC3 immediately before the sampling is V4, and the value of the voltage VC3 immediately after the sampling drops to V3, as illustrated in FIG. 3. When the critical mode power factor correction circuit 1 is under low load, the sampling frequency is higher than the sampling frequency under high load, as illustrated in FIG. 3. Here, as illustrated in FIGS. 3 and 10, as the sampling frequency becomes higher, the charging period from the resistor R1 to the capacitor C3 becomes shorter, so that the value (e.g., V1, V2) of the voltage VC3 of the capacitor C3 under low load becomes lower than the value (e.g., V3, V4) of the voltage VC3 of the capacitor C3 under high load. Under low load, the value of the voltage VC3 immediately before the sampling is V2, and the value of the voltage VC3 immediately after the sampling decreases to V1.

Next, the sampling frequency and the voltage values V1, V2, V3, V4 between both ends of the capacitor C3 are considered. First, the relationship between the voltage values V1 and V2 and the voltage values V3 and V4 is expressed by the following equation.

$$V1:V2=V3:V4=1/(C3+C4):1/C3$$

Figure 4A:
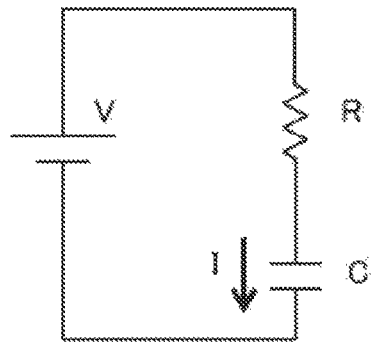
FIG. 4A is a diagram illustrating an equivalent circuit of an output voltage detection circuit extracted from FIG. 1, which is a simplification of the output voltage detection circuit.
Figure 4B:
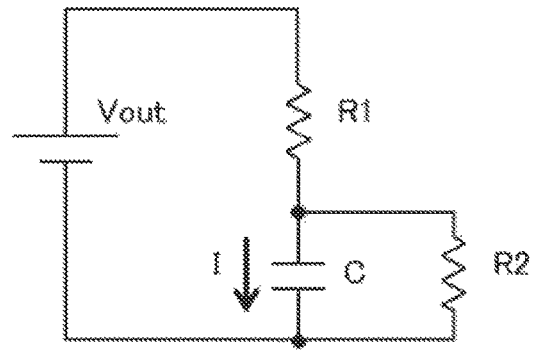
FIG. 4B is a diagram illustrating the output voltage detection circuit extracted from FIG. 1.

Note that C3 and C4 in the above equation indicate the capacitance values of the capacitors C3 and C4, respectively. Next, an equivalent circuit of the output voltage detection circuit illustrated in FIG. 1, which is a circuit simplified from the output voltage detection circuit, will be considered. FIG. 4A is a diagram illustrating the simplified equivalent circuit of the output voltage detection circuit illustrated in FIG. 1 and FIG. 4B is a diagram illustrating the output voltage detection circuit extracted from FIG. 1. The output voltage detection circuit illustrated in FIG. 4B is a little complicated, so the equivalent circuit illustrated in FIG. 4A, which is simplified from the output voltage detection circuit illustrated in FIG. 4B, will be considered. First, the equivalent circuit illustrated in FIG. 4A can be expressed as in Equation (1) below.

$$I=(V-Vc)/R=V/R-Vc/R \quad (1)$$

Next, the detection circuit illustrated in FIG. 4B can be expressed as the following Equation (2).

$$I=(Vout-Vc)/R1-Vc/R2$$

$$I=Vout/R1-Vc/R1-Vc/R2$$

$$I=Vout/R1-(Vc/R1+Vc/R2)$$

$$I=Vout/R1-Vc*(1/R1+1/R2)$$

$$I=Vout/R1-Vc*((R1+R2)/(R1*R2))$$

$$I=(Vout*R2)/(R1*R2)-Vc*((R1+R2)/(R1*R2))$$

$$I=(((Vout*R2)/(R1+R2))*(R1+R2))/(R1*R2)-Vc*(R1+R2)/(R1*R2)) \quad (2)$$

$$\left. \begin{array}{l} R = R1*R2/(R1+R2) \\ V = Vout*R2/(R1+R2) \end{array} \right\} \quad (3)$$

Here, if the condition is above Equation (3), Equation (2) can be expressed by I=V/R−Vc/R, which is the same as Equation (1). Note that R1, R2, and Vout in Equation (3) are all constants which do not change, and thus can be replaced. Therefore, the detection circuit of FIG. 4B can be replaced with the equivalent circuit of FIG. 4A.

Next, transient characteristics of the circuit 1 is considered. Since Vc in Equation (1) changes with time and thus is expressed as Vc(t), Equation (1) can be expressed by the following Equation (4).

$$I=V/R-Vc(t)/R \quad (4)$$

Also, since a relationship Vc=t*I/C is satisfied, the following Equation (5) is obtained.

$$I=C*Vc/t \quad (5)$$

Here, Vc in Equation (5) varies with time and thus is expressed as Vc(t), so the following equation (6) is obtained.

$$I=C*dVc(t)/dt \quad (6)$$

By applying Equation (6) to Equation (4), the following equation (7) is obtained.

$$C*dVc(t)/dt=V/R-Vc(t)/R$$

$$C*dVc(t)/dt=(V-Vc(t))/R$$

$$C*dVc(t)/(V-Vc(t))=dt/R$$

$$dVc(t)/((V-Vc(t))/C)=(1/R)dt$$

$$dVc(t)/(V/C-Vc(t)/C)=(1/R)dt$$

$$dVc(t)*(V/C-Vc(t)/C)^{-1}=(1/R)dt \quad (7)$$

By integrating Equation (7), the following Equation (8) is obtained.

$$ln(V/C-Vc(t)/C)=-t/(R*C)+lnK \quad (8)$$

lnK is an integration constant.
By solving for Vc(t), the following equation (9) is obtained.

$$V/C-Vc(t)/C=Ke^{(-t/(R*C))}$$

$$V-Vc(t)=KCe^{(-t/(R*C))}$$

$$Vc(t)-V=-KCe^{(-t/(R*C))}$$

$$Vc(t)=V-KCe^{(-t/(R*C))} \quad (9)$$

Since Vc(t)=0 when t=0, the following equation (10) is obtained.

$$0=V-KCK=V/C \quad (10)$$

Accordingly, Equation (9) can be expressed as the following Equation (11).

$$Vc(t)=V-Ve^{(-t/(R*C))}$$

$$Vc(t)=V(1-e^{(-t/(R*C))}) \quad (11)$$

By applying the condition of Equation (3) to Equation (11), the following Equation (12) is obtained.

$$Vc(t)=(Vout*R2/(R1+R2))*(1-e^{(-t/((R1*R2)/(R1+R2))*C)}) \quad (12)$$

Figure 5:
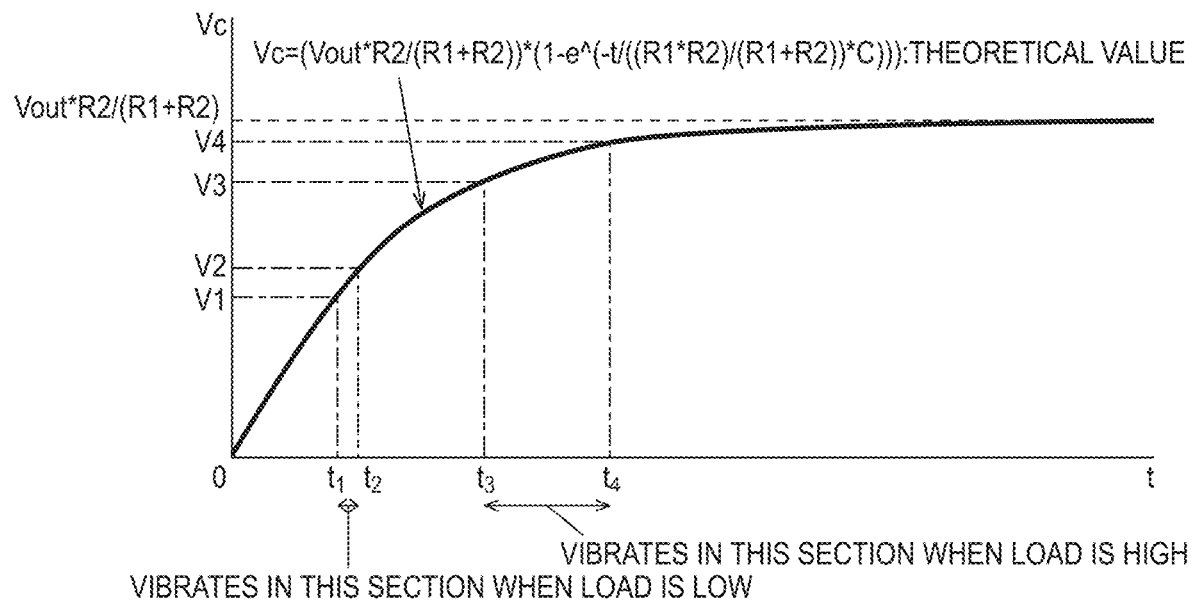
FIG. 5 is a characteristic diagram of the capacitor voltage Vc and the sampling cycle according to an embodiment or embodiments.

When Equation (12) is graphed, a characteristic diagram of the capacitor voltage Vc and the sampling cycle (i.e., 1/the sampling frequency) illustrated in FIG. 5 is obtained. As illustrated in FIG. 5, the voltage VC3 across the capacitor C3 varies along the sampling cycle (i.e., 1/the sampling frequency). The initial value varies depending on the sampling cycle (1/the sampling frequency) under high load. This means that this graph can be considered as a theoretical value. Next, how the initial values (V1, t1) and (V3, t3) are determined is considered. First, the sampling frequency under low load is expressed as f1, and the sampling frequency under high load is expressed as f3. Under low load, it may be necessary to satisfy the following Equation (13).

$$V1:V2 = 1/(C3 + C4):1/C3 \brace t2 - t1 = 1/f1 \qquad (13)$$

Under high load, it may be necessary to satisfy the following Equation (14).

$$V3:V4 = 1/(C3 + C4):1/C3 \brace t4 - t3 = 1/f3 \qquad (14)$$

Therefore, it finally stabilizes at a point where these conditions are satisfied. Also, referring to the graph of FIG. 5, the rate of change (the differential value) keeps changing, so there is only one stable point under each condition. Next, an equation that expresses the stable point is considered. First, for finding t, the following Equations (15) and (16) are used.

$$Vc(t)=V(1-e^{\wedge}(-t/(R^*C))) \qquad (15)$$

$$Vc(t)=V-Ve^{\wedge}(-t/(R^*C))$$

$$V-Vc(t)=Ve^{\wedge}(-t/(R^*C))$$

$$1-Vc(t)/V=e^{\wedge}(-t/(R^*C))$$

$$\ln(1-Vc(t)/V)=-t/(R^*C)$$

$$\ln((V-Vc(t))/V)=-t/(R^*C)$$

$$\ln(V/(V-Vc(t)))=t/(R^*C)$$

$$R^*C^*\ln(V/(V-Vc(t)))=t$$

$$t=R^*C^*\ln(V/(V-Vc(t))) \qquad (16)$$

Here, 1/f is expressed as Δt. (1/f=Δt)

Next, Va, a value of which becomes A times when t changes by Δt, will be found. From Equation (16), the following Equation (17) is obtained.

$$\Delta t=R^*C^*\ln(V/(V-Va))-R^*C^*\ln(V/(V-AVa))$$

$$\Delta t=R^*C^*(\ln(V/(V-Va))-\ln(V/(V-AVa)))$$

$$\Delta t/R/C=\ln(V/(V-Va))-\ln(V/(V-AVa))$$

$$\Delta t/R/C=\ln(V/(V-Va)/(V/(V-AVa)))$$

$$\Delta t/R/C=\ln((V-AVa)/(V-Va)) \qquad (17)$$

By solving Equation (17) for Va, the following Equation (18) is obtained.

$$\Delta t/R/C=\ln((V-AVa)/(V-Va))$$

$$e^{\wedge}(\Delta t/R/C)=(V-AVa)/(V-Va)$$

$$(V-Va)^*e^{\wedge}(\Delta t/R/C)=V-AVa$$

$$V^*e^{\wedge}(\Delta t/R/C)-Va^*e^{\wedge}(\Delta t/R/C)=V-AVa$$

$$AVa-Va^*e^{\wedge}(\Delta t/R/C)=V-V^*e^{\wedge}(\Delta t/R/C)$$

$$Va^*(A-e^{\wedge}(\Delta t/R/C))=V-V^*e^{\wedge}(\Delta t/R/C)$$

$$Va=(V-V^*e^{\wedge}(\Delta t/R/C))/(A-e^{\wedge}((\Delta t/R/C))) \qquad (18)$$

As a result, the initial value Va of the point where the value of the voltage of the capacitor C3 becomes A times higher when t changes by Δt can be obtained. By substituting Equation (18) into Equation (16) to find the initial value ta in time of the point, the following Equation (19) is obtained.

$$ta=R^*C^*\ln(V/(V-(V-V^*e^{\wedge}(\Delta t/R/C))/(A-e^{\wedge}(\Delta t/R/C)))) \qquad (19)$$

Figure 6:
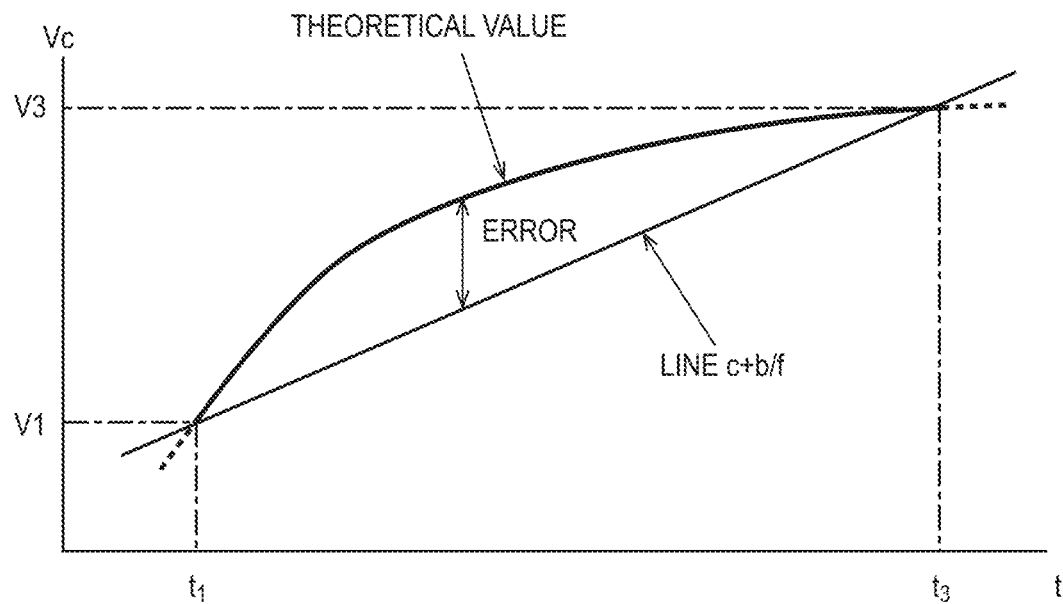
FIG. 6 is a characteristic diagram illustrating a theoretical value of the terminal voltage VC3 of the capacitor C3 relative to the sampling cycle and a line c+b/f with which the theoretical value is replaced based on measured values.

Next, a linear correction method according to an embodiment or embodiments is considered. In an embodiment or embodiments, in order to reduce the burden on the arithmetic unit CA, the theoretical value of the terminal voltage of the capacitor C3 illustrated in FIG. 6 is replaced by a straight line c+b/f, and the correction value with respect to the sampling frequency is calculated based on the straight line c+b/f. The straight line c+b/f illustrated in FIG. 6 is the straight line passing through V1, the measured voltage of the A/D converter A/D under low load, and V3, the measured voltage of the A/D converter A/D under high load. The reason for this is to avoid creating an area where an error becomes positive. This is because if the error becomes positive, the output voltage becomes higher than the target voltage, which may cause damage to components. The values "c" and "b" in the straight line c+b/f are given by the followings. First, by replacing the sampling frequency f with 1/Δt, the equation c+b/f can be expressed as c+b*Δt. That is, c+b/f=c+b*Δt. From this, the following Equations (20) and (21) can be obtained.

$$b=(V3-V1)/(\Delta t3-\Delta t1) \qquad (20)$$

$$c=V3-b^*\Delta t3 \qquad (21)$$

By applying Equation (18), which is Va=(V-V*e^(Δt/R/C))/(A-e^(Δt/R/C)), to Equations (20) and (21), the following Equations (22) and (23) can be obtained.

$$b=(V3-V1)/(\Delta t3-\Delta t1)=((V-V^*e^{\wedge}(\Delta t3/R/C))/(A-e^{\wedge}(\Delta t3/R/C))-(V-V^*e^{\wedge}(\Delta t1/R/C))/(A-e^{\wedge}(\Delta t1/R/C)))/(\Delta t3-\Delta t1) \qquad (22)$$

$$c=V3-b^*\Delta t3=(V-V^*e^{\wedge}(\Delta t3/R/C))/(A-e^{\wedge}(\Delta t3/R/C))-b^*\Delta t3 \qquad (23)$$

Here, the condition, which is Equation (3), is R=R1*R2/(R1+R2)V=Vout*R2/(R1+R2). In addition, "a" in the correction value a-b/f satisfies the following Equation (24).

$$a=V-c \qquad (24)$$

Thus, "a" can be calculated by the following Equation (25).

$$a=V-c$$

$$=V-((V-V^*e^{\wedge}(\Delta t3/R/C))/(A-e^{\wedge}(\Delta t3/R/C))-b^*\Delta t1)$$

$$=(V-V^*e^{\wedge}(\Delta t3/R/C))/(A-e^{\wedge}(\Delta t3/R/C))+b^*\Delta t3$$

$$=-V^*e^{\wedge}(\Delta t3/R/C)/(A-e^{\wedge}(\Delta t3/R/C))+(((V-V^*e^{\wedge}(\Delta t3/R/C))/(A-e^{\wedge}(\Delta t3/R/C))-(V-V^*e^{\wedge}(\Delta t1/R/C))/(A-e^{\wedge}(\Delta t1/R/C)))/(\Delta t3-\Delta t1))^*\Delta t3$$

$$=-V^*e^{\wedge}(\Delta t3/R/C)/(A-e^{\wedge}(\Delta t3/R/C))+(((V-V^*e^{\wedge}(\Delta t3/R/C))/(A-e^{\wedge}(\Delta t3/R/C)))-(V-V^*e^{\wedge}(\Delta t1/R/C))/(A-e^{\wedge}(\Delta t1/R/C)))/\Delta t1 \qquad (25)$$

Based on Equation (25) and Equation (22), the correction value calculator calculates the linear correction value a-b/f with respect to each sampling frequency. Accordingly, by adding the correction value calculated by the correction value calculator to the signal output from the A/D converter by the adder SUM, an accurate value can be obtained. Note that the constants in the equation a-b/f may be obtained based on actual measurement results from experiments, or V1 and V3 may be derived by simulation and applied to the constants in the correction value calculator.

Figure 7:
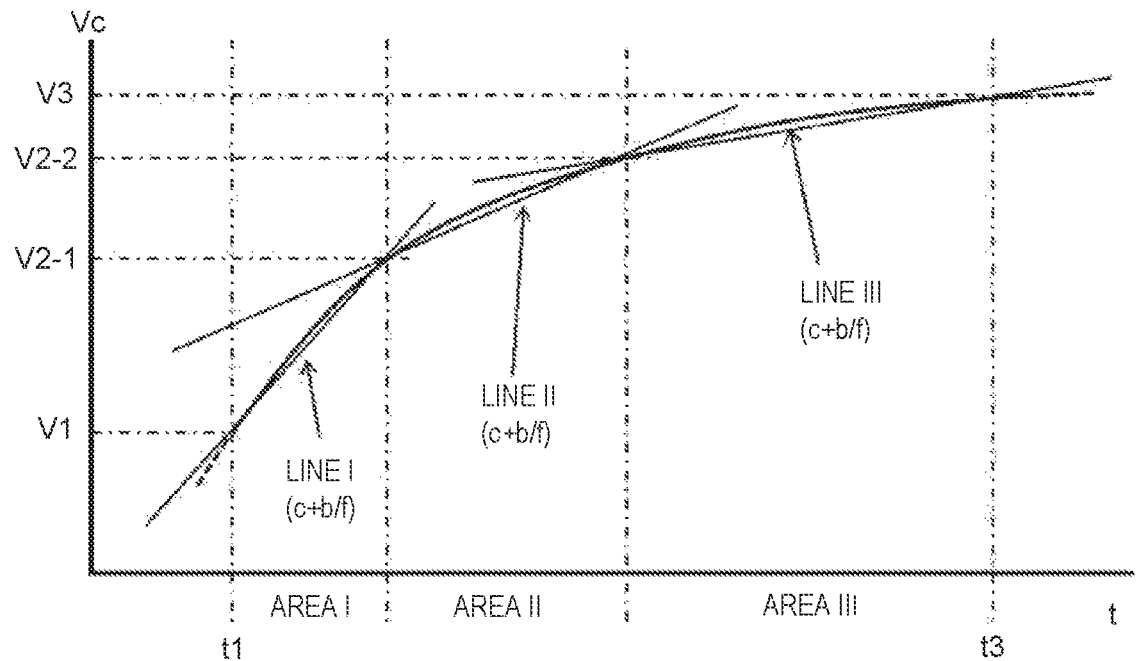
FIG. 7 is a diagram illustrating an example in which an area of the sampling cycle is divided into plural areas, and in each of the plural areas, the theoretical value of the terminal voltage VC3 of the capacitor C3 is replaced with the straight line c+b/f such as is illustrated in FIG. 6.

Note that referring to FIG. 6, the error between the theoretical value and the straight line c+b/f may be large. For this reason, such as being illustrated in FIG. 7, by dividing the sampling cycle (or the sampling frequency) into plural areas (or plural sampling frequency bands) and calculating the correction value a-b/f based on the correction constants set in each of the plural areas (or the plural sampling frequency bands), the error can be reduced.

According to one or more embodiments described above, a size of a circuit around the A/D converter in the integrated circuit that performs digital control of the critical mode power factor correction circuit can be reduced. Further, an accuracy of the output signal of the A/D converter may be improved with simple calculation by dividing the sampling frequency into plural sampling frequency bands and calculating the correction value in each of the plural sampling bands with a linear correction formula. Furthermore, by calculating the correction value using the linear correction formula, a general-purpose arithmetic unit (CPU) can be used instead of a high-speed and expensive arithmetic unit (CPU).

One or more embodiments described above are only examples for embodying the technical concept of the invention, and do not limit configurations, combinations, and etc. One or more embodiments described above may be changed as appropriate within the scope of the technical concept of the invention. For example, it is possible to reduce the number of steps in the calculation by the arithmetic unit, by using a formula Vc=a−b×T for linear correction, which is obtained by replacing the sampling frequency f in the formula Vc=a−b/f for linear correction with the cycle T, to replace the division performed by the arithmetic unit with multiplication performed by the arithmetic unit.

As described above, the integrated circuit according to one or more embodiments described above is suitable for use in digital control of a critical mode power factor correction circuit. Therefore, it can be used for a power supply for TV equipment such as an LCD TV and an OLED TV.

The invention includes other embodiments and modifications in addition to one or more embodiments described above without departing from the spirit of the invention. One or more embodiments described above are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An integrated circuit for digitally controlling a critical mode power factor correction circuit, the integrated circuit comprising:
    an output voltage detector and a switching current detector of the critical mode power factor correction circuit;
    an A/D converter and a sample and hold circuit that perform analog-to-digital conversion of an output signal of the output voltage detector and the switching current detector, wherein a sampling frequency of the A/D converter and the sample and hold circuit is synchronized with a variable switching frequency of the critical mode power factor correction circuit;
    an arithmetic unit that performs calculation based on the output signal of the A/D converter and generates a pulse signal to turn on and off a switching device of the critical mode power factor correction circuit;
    a correction value calculator that calculates, based on the sampling frequency, a linear correction value for correcting the output signal of the A/D converter; and
    an adder that adds the linear correction value calculated by the correction value calculator to the output signal of the A/D converter to correct the output signal of the A/D converter and inputs the corrected output signal to the arithmetic unit, wherein
    calculating the linear correction value by the correction value calculator comprises calculating the linear correction value based on a formula Vc=a−b/f for linear correction, where "a" and "b" are correction constants, "f" is the sampling frequency, and "Vc" is the linear correction value, and
    an area of the sampling frequency is divided into at least two sampling frequency bands, and the correction constants are set for each of the at least two sampling frequency bands.

2. A method of digitally controlling a critical mode power factor correction circuit, the method comprising:
    detecting an output voltage of the critical mode power factor correction circuit and a switching current of a switching device of the critical mode power factor correction circuit;
    performing, by an analog-to-digital convertor, analog-to-digital conversion of the output voltage, while synchronizing a sampling frequency of the analog-to-digital conversion with a variable switching frequency of the switching current;
    calculating a linear correction value, for correcting an output signal of the analog-to-digital convertor based on the sampling frequency;
    adding the linear correction value to the output signal of the analog-to-digital convertor, so as to obtain the corrected output signal of the analog-to-digital converter; and
    performing calculation, based on the corrected output signal, to generate a pulse signal to turn on and off the switching device of the critical mode power factor correction circuit, wherein
    calculating the linear correction value comprises calculating the linear correction value based on a formula Vc=a−b/f for linear correction, where "a" and "b" are correction constants, "f" is the sampling frequency, and "Vc" is the linear correction value.

3. The method of digitally controlling the critical mode power factor correction circuit according to claim 2, wherein an area of the sampling frequency is divided into at least two sampling frequency bands, and the correction constants are set for each of the at least two sampling frequency bands.

* * * * *